J. A. MICHAEL.
COMBINED BRACE AND CUSHIONING DEVICE FOR VEHICLES.
APPLICATION FILED MAY 12, 1914.
1,128,996.
Patented Feb. 16, 1915.
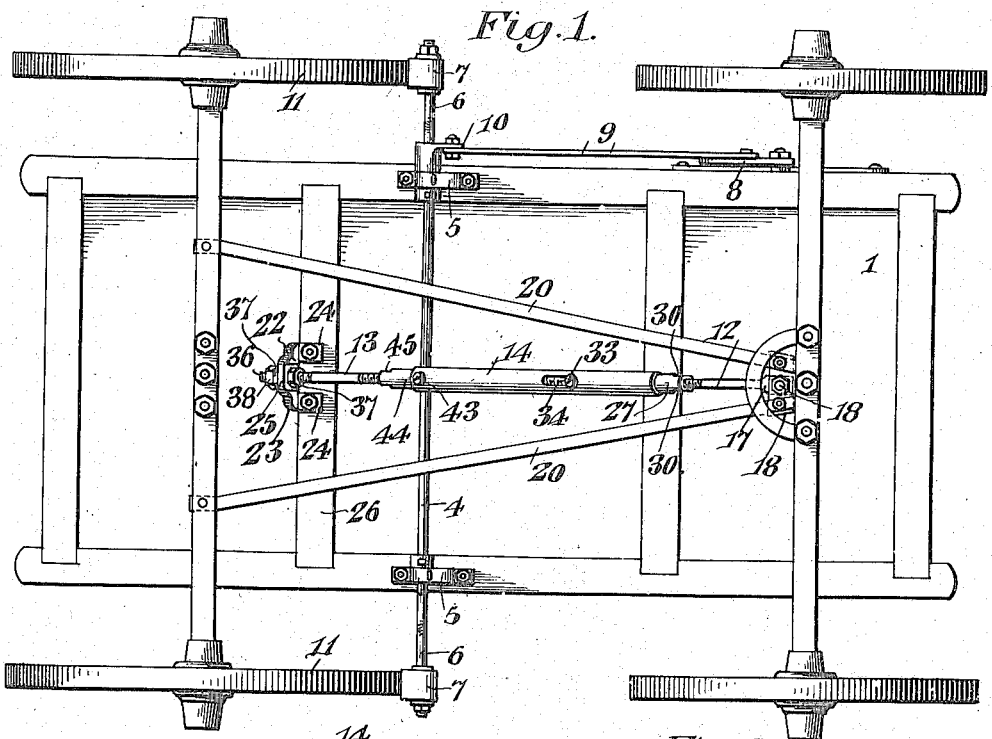
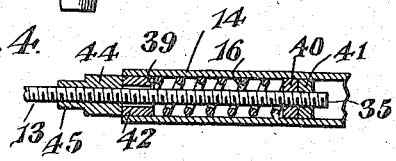
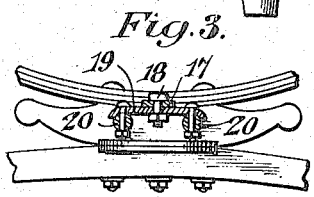
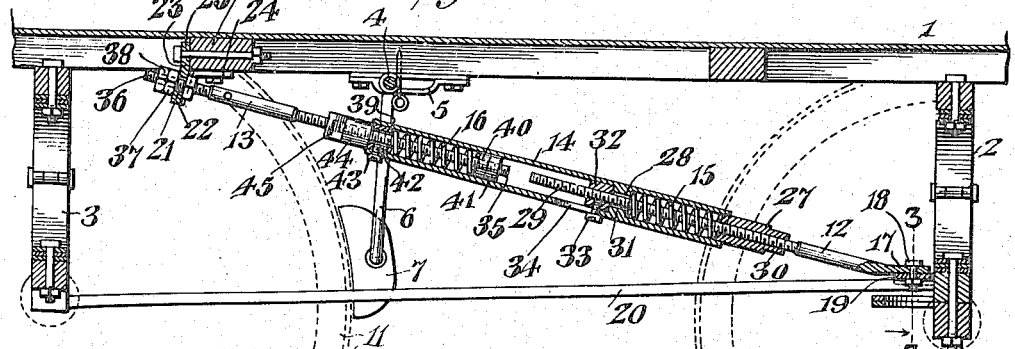
WITNESSES
Jacob A. Michael, INVENTOR
BY
ATTORNEYS

UNITED STATES PATENT OFFICE.

JACOB A. MICHAEL, OF LAUREL HILL, VIRGINIA.

COMBINED BRACE AND CUSHIONING DEVICE FOR VEHICLES.

1,128,996.  Specification of Letters Patent.  Patented Feb. 16, 1915.

Application filed May 12, 1914. Serial No. 838,097.

*To all whom it may concern:*

Be it known that I, JACOB A. MICHAEL, a citizen of the United States, residing at Laurel Hill, in the county of Augusta and State of Virginia, have invented certain new and useful Improvements in Combined Braces and Cushioning Devices for Vehicles, of which the following is a specification.

The invention relates to a combined brace and cushioning device for vehicles, and the present application is filed to take the place of a previous application for a similar device, filed April 16, 1912, Serial No. 691,137.

The object of the present invention is to provide a simple, inexpensive, and efficient device, of strong and durable construction, adapted to be readily connected with a vehicle body and the running gear to enable a brake to be mounted on the body and to be applied without causing the body of the vehicle to pitch forward and strain or otherwise injure the springs or other fastening means, especially when the vehicle is descending an incline.

A further object of the invention is to provide a combined brace and cushioning device of this character, equipped with means for cushioning the body of a vehicle against either forward or backward movement, so that the springs will not be strained when a loaded vehicle is ascending a hill.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a reverse plan view of a vehicle provided with a combined brace and cushioning device constructed in accordance with this invention. Fig. 2 is a central longitudinal sectional view of the same. Fig. 3 is a transverse sectional view on the line 3—3 of Fig. 2. Fig. 4 is a detail sectional view taken longitudinally of the rear portion of the combined brace and cushioning device.

Like numerals of reference designate corresponding parts in all the figures of the drawing.

In the accompanying drawing, in which is illustrated the preferred embodiment of the invention, 1 designates a vehicle body supported by front and rear transversely disposed elliptic springs 2 and 3, and equipped with a brake having a transversely disposed shaft 4 mounted in suitable bearings 5 of the vehicle body, and provided at its ends with terminal arms 6 carrying brake shoes 7.

While the device is shown applied to a vehicle having its body supported by transversely disposed elliptic springs, and is particularly effective when used on a vehicle of this character, it is also applicable to and most advantageously employed on vehicles having the body supported by any other arrangement of springs. The brake is provided with suitable operating mechanism, consisting of a lever 8 connected by a rod 9, with an arm 10 extending upwardly from the transverse brake shaft in the usual manner. As any suitable operating mechanism may be employed for partially rotating the brake shaft, further illustration of such mechanism is deemed unnecessary.

The brake shoes are arranged to engage the rear wheels 11 and when the brake is applied, especially when the vehicle is descending an incline, there is a tendency of the body to pitch forward, thereby straining the transversely disposed springs 2 and 3 and the fastening means for securing the springs to the body and to the running gear. In order to relieve the springs 2 and 3 of their strain, the vehicle is equipped with an inclined longitudinally disposed brace extending upwardly and rearwardly and connected at its upper or rear end with the rear portion of the vehicle body, and at its lower or front end with the front portion of the running gear, and adapted to yieldably resist any forward or backward movement of the vehicle body 1 with relation to the running gear.

The cushioning brace comprises front and rear end rods or members 12 and 13, and an intermediate connecting tube or casing 14, forming a housing having front and rear cushioning springs 15 and 16. The front end 17 of the rod or member 12 is flattened and is secured by a bolt 18 or other suitable fastening device to a plate 19, which extends across the space between a pair of rearwardly diverging reach bars 20, being bolted or otherwise secured to the same. The upper end of the rear inclined rod or member 13 extends through an opening 21 in an inclined flange 22 of a bracket 23, provided with horizontal and vertical lugs 24 and 25, which are bolted to the lower face and rear edge of a transverse bar or cleat 26 of the body of the vehicle. The bracket may consist of a casting or it can be conveniently stamped from a single piece of metal, which is cut between the horizontal fastening lugs 24 and bent to form the vertical lug 25.

The lower spring 15, which is of spiral form, is adapted to resist relative forward movement of the vehicle body, and it is disposed on the lower rod or member 12 and interposed between a sleeve or nut 27 and an interior shoulder 28 of the intermediate tubular member or casing 14. The intermediate and upper portions of the front rod 12 are provided with screw threads 29, and the sleeve or nut 27, which is interiorly threaded to engage the threads 29, forms a seat for the lower or front end of the cushioning spring 15, and is adapted to be adjusted to vary the tension of the spring. The sleeve or nut 27, which has opposite flattened portions 30 to be engaged by a wrench or other suitable tool, extends into the lower end of the intermediate tubular member or casing and forms a closure for the same, to protect the device from dust, dirt, and other accumulation. The shoulder 28 is formed by an interior collar or flange 31, through which the front rod extends and which is adapted to be engaged by a nut 32, to form a stop to limit the relative rearward movement of the intermediate tubular member when there is a tendency of the vehicle body to move rearwardly, as for instance, when the vehicle is ascending a hill. The stop nut 32 carries a screw 33 operating in a slot 34 at the bottom of the tube or casing 14, and adapted to prevent relative movement of the stop nut, which is adjustable and coöperates with the sleeve or nut 27 to place the cushioning spring 15 under the desired tension, and also to adjust the parts to fit the vehicle to which the combined brace and cushioning device is to be applied. Also, the screw 33 is adapted to engage the rear end wall of the slot 34, and may be employed for limiting the relative forward movement of the tube or casing 14 to prevent the spring 15 from being subjected to a crushing pressure. The upper cushioning spring 16, which is also of spiral form, is disposed on the rod or member 13, which is provided at its upper and lower portions with screw threads 35 and 36. The upper screw threads 36 receive adjusting nuts 37 and a lock nut 38. The adjusting nuts are located at opposite sides of the flange 22 of the bracket 23, and the lock nut 38 engages the rear one of the adjusting nuts. The adjustable connection between the upper end of the rear rod or member 13 permits the said rod or member to be moved forwardly or rearwardly to arrange it in proper position with relation to to the intermediate tubular member or casing 14. The intermediate unthreaded portion of the upper or rear rod is designed to be provided with a perforation or other suitable means for receiving a spanner or other suitable tool for engaging the rod 13 in the adjustment thereof. The rear spring 16 is interposed between a shoulder 39 of the tubular member 14 and a nut 40, mounted on the lower or front threaded portion 35 of the rod 13, and forming an adjustable seat for the front end of the spring 16. The nut 40 is secured in its adjustment by a lock nut 41, but any other suitable means may, of course, be employed. The nuts 40 and 41 are adapted to be adjusted to vary the tension of the spring 16. The shoulder 39 is formed by a removable collar or bushing 42, secured within the rear end of the tubular member 14 by a screw 43 or other suitable fastening device, and adapted to be detached in assembling and separating the rear rod and the intermediate tubular member. The lower front threaded portion of the rod 13 also receives an adjustable sleeve or nut 44, having flattened portions 45 for the reception of a wrench or other suitable tool, and constituting an adjustable stop or abutment adapted to be engaged by the rear end of the tubular member to limit the relative movement of the rear rod and the intermediate tubular member in the operation of the front cushioning spring.

When the brake is applied, the tendency of the vehicle body to move forwardly with relation to the running gear is counteracted and cushioned by the front spring 15, which effectually prevents the body from being thrown forward sufficiently to strain the vehicle springs or the fastening means thereof, and the slidable connection of the front and rear cushioning means permit the body to move vertically in the action of the transverse elliptic springs 2 and 3. Also, the rear spring 16 is of sufficient strength to prevent the vehicle body from pitching rearwardly and straining the vehicle springs 2 and 3, or the fastening means thereof, when the vehicle is traveling uphill with a load. When the front cushioning device is in action, the rear cushioning device forms a rigid connection between the intermediate tubular member and the rear rod 13, and when the rear cushioning device is in action, the front cushioning device forms a rigid connection between the tube or casing 14 and the front rod 12.

What is claimed is:

1. A combined bracing and cushioning device for vehicles including end rods, an intermediate tubular member slidably receiving the said rods, cushioning means housed within the intermediate tubular member and arranged to cushion the relative slidable movement of one rod in one direction and the other rod in the opposite direction, and means for connecting the end rods with the body and running gear of a vehicle.

2. A combined bracing and cushioning device for vehicles arranged at an inclination and including front and rear rods, an intermediate tubular member slidably receiving the inner ends of the said rods, means for connecting the front rod with the running gear and the rear rod with the body of a vehicle, and cushioning springs housed within the tubular member and arranged to cushion the relative movement of one rod in one direction and the relative movement of the other rod in the opposite direction.

3. A combined bracing and cushioning device for vehicles including front and rear rods, an intermediate tubular member slidably receiving the inner ends of the rods and provided with front and rear shoulders, coiled springs arranged on the rods and having their rear ends seated against the said shoulders, and adjustable means mounted on the rods and engaging the front ends of the cushioning springs.

4. A combined bracing and cushioning device for vehicles including front and rear rods, an intermediate tubular member slidably receiving the inner ends of the rods and provided with front and rear shoulders, front and rear springs arranged on the rods in advance of the said shoulders and having their rear ends seated against the same, means carried by the rods for engaging the front ends of the springs, and stops or abutments mounted on the rods and arranged to engage the intermediate tubular member to form a rigid abutment at one rod when the spring of the other rod is in action.

5. A combined bracing and cushioning device for vehicles including front and rear rods, an intermediate tubular member slidably receiving the inner portions of the rods and provided with spaced interiorly arranged collars through which the rods extend, front and rear cushioning springs mounted on the rods in advance of the collars, and stops mounted on the rods in rear of the collars and arranged to engage the same.

6. A combined bracing and cushioning device for vehicles including front and rear rods, an intermediate tubular member slidably receiving the inner portions of the said rods and provided with front and rear collars, the front collar being located at a point intermediate of the ends of the tubular member, and the rear collar being detachably secured within the rear end of the said member, springs disposed on the said rods in advance of the said collars, means carried by the rods for engaging the front ends of the springs, and stops or abutments mounted on the rods in rear of the collars and arranged to engage the same.

7. A combined bracing and cushioning device for vehicles including front and rear rods having inner threaded portions, an intermediate tubular member slidably receiving the said threaded portions of the rods and provided with interior collars through which the rods extend, front and rear springs arranged on the rods in advance of the collars, and nuts arranged on the threaded portions of the said rods and arranged respectively at the front ends of the springs and in rear of the said collars.

8. A combined bracing and cushioning device for vehicles including a bracket having means for securing it to the body of a vehicle, an inclined longitudinally disposed rod having its upper end passing through the said bracket, said rod extending downwardly and forwardly from the said bracket, a spring disposed on the rod, a tubular member slidably connected with the rod and forming a housing for the said spring, adjustable means mounted on the rod and engaging the spring at one end thereof, said tubular member having means for engaging the other end of the spring, and means for connecting the front end of the combined bracing and cushioning device with the running gear of a vehicle.

9. A combined bracing and cushioning device for vehicles including an inclined rod, a tubular member receiving the lower portion of the rod and having an interior shoulder, means for connecting the upper end of the rod with the body of a vehicle, a spring disposed on the rod and housed within the tubular member, said spring being arranged in advance of the said shoulder, and an adjustable abutment carried by the rod and forming a stop for the tubular member.

10. A combined bracing and cushioning device for vehicles including a front inclined rod, means for securing the same to the running gear of a vehicle, a tubular member receiving the rear portion of the rod and provided with an interior collar and having a slot, a spring disposed on the rod in advance of the collar, an adjustable abutment mounted on the rod in rear of the collar and having fastening means operating in the said slot, and means for connecting the tubular member with the body of a vehicle.

In testimony whereof I affix my signature in presence of two witnesses.

JACOB A. MICHAEL.

Witnesses:
 JOHN CROSBY,
 FRED PRUFER.